United States Patent
Cho et al.

(10) Patent No.: US 10,472,517 B2
(45) Date of Patent: Nov. 12, 2019

(54) ULTRAVIOLET CURABLE PRIMER FOR RADIO-WAVE TRANSMISSION COVER OF VEHICLE

(71) Applicants: Hyundai Motor Company, Seoul (KR); Kia Motors Corporation, Seoul (KR); NOROOBEE Chemical Co., Ltd., Cheonan-si (KR)

(72) Inventors: Byung Kyu Cho, Seoul (KR); So Jung Shim, Seoul (KR); Seung Chan Hong, Anseong-si (KR); Yong Chul Lee, Cheonan-si (KR); Jae Beom Ahn, Anyang-si (KR); Young Seok Kim, Cheonan-si (KR)

(73) Assignees: Hyundai Motor Company, Seoul (KR); Kia Motors Corporation, Seoul (KR); NOROOBEE Chemical Co., Ltd., Cheonan-si (KR)

( * ) Notice: Subject to any disclaimer, the term of this patent is extended or adjusted under 35 U.S.C. 154(b) by 149 days.

(21) Appl. No.: 15/828,824

(22) Filed: Dec. 1, 2017

(65) Prior Publication Data
US 2018/0371240 A1    Dec. 27, 2018

(30) Foreign Application Priority Data
Jun. 21, 2017 (KR) .......... 10-2017-0078630

(51) Int. Cl.
*C08L 75/16* (2006.01)
*C08L 75/14* (2006.01)
(Continued)

(52) U.S. Cl.
CPC .......... *C08L 75/14* (2013.01); *C08L 33/08* (2013.01); *C08L 75/16* (2013.01); *C08L 2203/00* (2013.01); *G01S 13/931* (2013.01)

(58) Field of Classification Search
CPC ........................................... C08L 75/16
See application file for complete search history.

(56) References Cited

U.S. PATENT DOCUMENTS 6,998,425 B2 * 2/2006 Chisholm .......... C09D 4/00 522/13
8,754,145 B1 * 6/2014 Haubrich .......... C09D 133/08 522/6

(Continued)

FOREIGN PATENT DOCUMENTS

JP    2005298619 A * 10/2005
JP    2010071004 A *  4/2010
(Continued)

OTHER PUBLICATIONS

Machine Translation of JP 2005298619 (Year: 2019).*
(Continued)

*Primary Examiner* — Michael M Dollinger
(74) *Attorney, Agent, or Firm* — Morgan, Lewis & Bockius LLP

(57) ABSTRACT

An ultraviolet curable primer for a radio-wave transmission cover of a vehicle may include about 20 wt % to about 30 wt % of urethane acrylate oligomer, about 35 wt % to about 60 wt % of monomer, about 1 wt % to about 5 wt % of photopolymerization initiator, about 0.1 wt % to about 1.0 wt % of wetting additive, and about 10 wt % to about 30 wt % of solvent, wherein the urethane acrylate oligomer comprises about 7.5 wt % to about 12.5 wt % of two-function urethane acrylate oligomer based on the total weight of the ultraviolet curable primer, and about 12.5 wt % to about 17.5 wt % of six-function urethane acrylate oligomer based on the total weight of the ultraviolet curable primer, and wherein the ultraviolet curable primer is applied to a radio-wave transmission cover comprising a multilayered oxide optical film.

12 Claims, 1 Drawing Sheet

| Sort | Composition (WT%) | | | | | | | | Exterior Appearance (Distinctness) | Heat Resistance | Water Resistance | Weather Resistance |
|---|---|---|---|---|---|---|---|---|---|---|---|---|
| | Oligomer | | | | | Monomer | | | | | | |
| | Urethane Acrylate | | | Polyester Acrylate | | | | | | | | |
| | Two-Function | Four-Function | Six-Function | Two-Function | Six-Function | PETA | TMPTA | HDDA | | | | |
| Comparative Example 1 | 25 | - | - | - | - | 15 | 30 | 6.5 | 75 | N.G | N.G | N.G |
| Comparative Example 2 | - | 25 | - | - | - | 15 | 30 | 6.5 | 60 | N.G | Good | Good |
| Comparative Example 3 | - | - | 25 | - | - | 15 | 30 | 6.5 | 55 | Good | Good | Good |
| Comparative Example 4 | - | - | - | 25 | - | 15 | 30 | 6.5 | 70 (Film of Paint Haze) | N.G | N.G | N.G |
| Comparative Example 5 | - | - | - | - | 25 | 15 | 30 | 6.5 | 70 | N.G | N.G | Good |
| Comparative Example 6 | - | - | 30 | - | - | 10 | 30 | 6.5 | 50 (Exterior Appearance Crack) | Good | Good | Good |
| Comparative Example 7 | 5 | - | 20 | - | - | 15 | 30 | 6.5 | 60 | Good | Good | Good |
| Comparative Example 8 | 15 | - | 10 | - | - | 15 | 30 | 6.5 | 70 | N.G | Good | Good |
| Example 1 | 10 | - | 15 | - | - | 15 | 30 | 6.5 | 70 | Good | Good | Good |

(51) Int. Cl.
    *C08L 33/08*     (2006.01)
    *G01S 13/93*     (2006.01)

(56) References Cited

U.S. PATENT DOCUMENTS

| | | | |
|---|---|---|---|
| 10,227,501 B2* | 3/2019 | Hwang | C09D 7/48 |
| 2014/0301096 A1* | 10/2014 | Ahn | B05D 3/067 |
| | | | 362/487 |
| 2015/0226836 A1* | 8/2015 | Shim | G01S 7/02 |
| | | | 428/336 |
| 2016/0108277 A1* | 4/2016 | Kim | C09D 4/00 |
| | | | 428/423.1 |
| 2016/0130176 A1* | 5/2016 | Cho | C03C 17/23 |
| | | | 428/216 |
| 2017/0313911 A1* | 11/2017 | Fukuda | B29C 41/00 |
| 2018/0371258 A1* | 12/2018 | Petricci | C08G 18/5015 |

FOREIGN PATENT DOCUMENTS

| | | | |
|---|---|---|---|
| JP | 2012140516 A * | 7/2012 | |
| KR | 10-2011-0050952 A | 5/2011 | |
| KR | 10-2014-0098471 | 8/2014 | |
| KR | 20170084396 A * | 7/2017 | |
| WO | WO-2016011944 A1 * | 1/2016 | C09D 133/06 |

OTHER PUBLICATIONS

Machine Translation of JP 2010071004 (Year: 2019).*
Machine Translation of KR 20110050952 A (Year: 2019).*
Machine Translation of KR 20140098471 (Year: 2019).*

* cited by examiner

| Sort | Composition (WT%) | | | | | | | | Exterior Appearance (Distinctness) | Heat Resistance | Water Resistance | Weather Resistance |
|---|---|---|---|---|---|---|---|---|---|---|---|---|
| | Oligomer | | | | | | Monomer | | | | | |
| | (Urethane Acrylate) | | | (Polyester Acrylate) | | | | | | | | |
| | Two-Function | Four-Function | Six-Function | Two-Function | Six-Function | PETA | TMPTA | HDDA | | | | |
| Comparative Example 1 | 25 | – | – | – | – | 15 | 30 | 6.5 | 75 | N.G | N.G | N.G |
| Comparative Example 2 | – | 25 | – | – | – | 15 | 30 | 6.5 | 60 | N.G | Good | Good |
| Comparative Example 3 | – | – | 25 | – | – | 15 | 30 | 6.5 | 55 | Good | Good | Good |
| Comparative Example 4 | – | – | – | 25 | – | 15 | 30 | 6.5 | 70 (Film of Paint Haze) | N.G | N.G | N.G |
| Comparative Example 5 | – | – | – | – | 25 | 15 | 30 | 6.5 | 70 | N.G | N.G | Good |
| Comparative Example 6 | – | – | 30 | – | – | 10 | 30 | 6.5 | 50 (Exterior Appearance Crack) | Good | Good | Good |
| Comparative Example 7 | 5 | – | 20 | – | – | 15 | 30 | 6.5 | 60 | Good | Good | Good |
| Comparative Example 8 | 15 | – | 10 | – | – | 15 | 30 | 6.5 | 70 | N.G | Good | Good |
| Example 1 | 10 | – | 15 | – | – | 15 | 30 | 6.5 | 70 | Good | Good | Good |

ULTRAVIOLET CURABLE PRIMER FOR RADIO-WAVE TRANSMISSION COVER OF VEHICLE

CROSS REFERENCE TO RELATED APPLICATION

The present application claims priority to Korean Patent Application No. 10-2017-0078630, filed on Jun. 21, 2017, the entire contents of which is incorporated herein for all purposes by this reference.

BACKGROUND OF THE INVENTION

Field of the Invention

The present invention relates to an ultraviolet curable primer, and, more particularly, to an ultraviolet curable primer for a radio-wave transmission cover of a vehicle. Such ultraviolet curable primer has an excellent exterior appearance and heat-resistant properties. The ultraviolet curable primer can be used for a smart cruise control (SCC) cover located on a grill of a vehicle.

Description of Related Art

In general, a smart cruise control (SCC) is a system that transmits and receives millimeter waves through radar mounted in the front of a vehicle and controls the acceleration and deceleration of the vehicle based on the distance between the measured preceding vehicle and the vehicle and the speed of the preceding vehicle relative to the vehicle. SCC is useful to maintain the proper distance and speed between the preceding vehicle and the vehicle.

For mounting a radio-wave transmission cover such as an SCC cover to a vehicle, method of forming a multilayered oxide optical film using metal oxides within a radar transmission path have been attempted. Such methods aim to secure high radio-wave transmittance while securing continuity (aesthetics) and radar transmission and reception with a radiator grill.

For instance, the multilayered oxide optical film can be located between a front resin layer made of a transparent material and a back resin layer made of an opaque material. More specifically, after injection molding of the front resin layer, a primer is applied to the back surface of the front resin layer and then the multilayered oxide optical film is deposited thereon to make a metal texture. Furthermore, the back resin layer is formed on the back surface of the multilayered oxide optical film by insert injection to protect the optical film.

However, since the back resin layer is formed at a high temperature of about 220° C. or more by insert injection, the front resin layer or the multilayered oxide optical film may be deformed or cracked.

To solve or avoid such problems, methods of applying a heat-resistant paint having heat resistance to a multilayered oxide optical film and then forming a back resin layer by insert injection has been attempted. These methods aim to block heat applied to a front resin layer and the multilayered oxide optical film and prevent occurrence of defects.

However, since it is difficult to perfectly block heat transferred to the front resin layer and the primer even when the heat-resistant paint is used, defects such as deformation, discoloration, or cracks may still occur in the pre-formed layers.

Therefore, there is a need for an ultraviolet curable primer for a radio-wave transmission cover of a vehicle, which easily deposits a multilayered oxide optical film to produce a metal texture while also preventing damage of a front resin layer in a high-temperature environment. There is also a need for an ultraviolet curable primer with excellent distinctness which can improve the exterior appearance of the radio-wave transmission cover.

The foregoing is intended merely to aid in the understanding of the background of the present invention, and is not intended to mean that the present invention falls within the purview of the related art that is already known to those skilled in the art.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an ultraviolet curable primer for a radio-wave transmission cover of a vehicle, capable of having excellent heat resistance to protect a front resin layer and minimize damage such as deformation thereof in a high-temperature environment when manufacturing a radio-wave transmission cover of a vehicle, and of having excellent distinctness to improve an exterior appearance of the radio-wave transmission cover of the vehicle.

In one aspect of the present invention, provided herein is an ultraviolet curable primer for a radio-wave transmission cover of a vehicle. The ultraviolet curable primer can be applied to a radio-wave transmission cover wherein the radio-wave transmission cover may include multilayered oxide optical film. Provided herein is an ultraviolet curable primer including about 20 wt % to about 30 wt % of urethane acrylate oligomer, about 35 wt % to about 60 wt % of monomer, about 1 wt % to about 5 wt % of photopolymerization initiator, about 0.1 wt % to about 1.0 wt % of wetting additive, and about 10 wt % to about 30 wt % of solvent, wherein the urethane acrylate oligomer includes about 7.5 wt % to 12.5 wt % of two-function urethane acrylate oligomer based on the total weight of the ultraviolet curable primer, and about 12.5 wt % to about 17.5 wt % of six-function urethane acrylate oligomer based on the total weight of the ultraviolet curable primer.

The monomer may include about 10 wt % to 20 wt % of pentaerythritol tetraacrylate (PETA), about 20 wt % to about 30 wt % of trimethyol propane triacrylate (TMPTA), and about 5 wt % to about 10 wt % of hexandiol diacrylate (HDDA).

The urethane acrylate oligomer may be provided by mixing the two-function urethane acrylate oligomer and the six-function urethane acrylate oligomer, and the two-function urethane acrylate oligomer and the six-function urethane acrylate oligomer may be mixed at a weight ratio of 1:1 to 2.5.

The urethane acrylate oligomer may not include a four-function urethane acrylate oligomer.

The urethane acrylate oligomer may have a solid content of about 70 wt % to about 80 wt %.

A crack may not occur in the ultraviolet curable primer after elapse of 10 to 20 minutes at a temperature of about 220° C. to about 240° C. after the ultraviolet curable primer is dried.

The ultraviolet curable primer may have a distinctness of 65 or more after it is dried, and a haze defect may not occur in a film of paint.

As apparent from the above description, in accordance with the embodiments of the present invention, when the radio-wave transmission cover of the vehicle such as a smart cruise control cover made of a resin material is manufactured, it is possible to secure heat resistance to form the back resin layer by insert injection at a high temperature of 220° C. or more, and to minimize deformation and prevent damage such as deformation and cracks of the front resin layer.

In addition, it is possible to secure an excellent exterior appearance since the primer has a distinctness of 65 or more and a haze defect does not occur in the film of paint.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a table measuring and indicating physical properties of a film of paint manufactured using comparative examples and an example having various compositions.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the FIGURES, reference numbers refer to the same or equivalent parts of the present invention throughout the several FIGURES of the drawing.

DETAILED DESCRIPTION OF EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terminology used in the specification of the present invention is for the purpose of describing particular embodiments only and is not intended to limit the invention. As used in the specification and the appended claims, the singular forms are intended to include the plural forms as well, unless context clearly indicates otherwise. It will be further understood that the terms "comprises" and/or "comprising," when used in the present specification, specify the presence of stated features, regions, integers, steps, operations, elements, and/or components, but do not preclude the presence or addition of one or more other features, regions, integers, steps, operations, elements, and/or components thereof.

Unless otherwise defined, all terms, including technical and scientific terms, used herein have the same meaning as commonly understood by one of ordinary skill in the art. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

An ultraviolet curable primer for a radio-wave transmission cover of a vehicle according to the exemplary embodiments of the present invention will be described below with reference to the accompanying drawings.

In various exemplary embodiments, an ultraviolet curable primer for a radio-wave transmission cover of a vehicle is applied to the back surface of a front resin layer to smoothly deposit a multilayered oxide optical film. As such, the ultraviolet curable primer provides excellent heat resistance and minimizes damage such as deformation or discoloration of the back resin layer when the back resin layer is formed by insert injection in a high-temperature environment. Also, the ultraviolet curable primer of the present invention prevents damage of the front resin layer.

In addition, the ultraviolet curable primer for a radio-wave transmission cover of a vehicle has an effect of improving the exterior appearance of a radio-wave transmission cover since the ultraviolet curable primer has a high distinctness of 70 or more which provides a metal texture to the subsequently deposited multilayered oxide optical film.

The ultraviolet curable primer for a radio-wave transmission cover of a vehicle according to the exemplary embodiment of the present invention may include about 20 wt % to about 30 wt % (e.g., about 20 wt %, about 21 wt %, about 22 wt %, about 23 wt %, about 24 wt %, about 25 wt %, about 26 wt %, about 27 wt %, about 28 wt %, about 29 wt %, or about 30 wt %) of urethane acrylate oligomer, about 35 wt % to about 60 wt % (e.g., about 35 wt %, about 36 wt %, about 37 wt %, about 38 wt %, about 39 wt %, about 40 wt %, about 41 wt %, about 42 wt %, about 43 wt %, about 44 wt %, 45 wt %, about 46 wt %, about 47 wt %, about 48 wt %, about 49 wt %, about 50 wt %, about 51 wt %, about 52 wt %, about 53 wt %, about 54 wt %, 55 wt %, about 56 wt %, about 57 wt %, about 58 wt %, about 59 wt %, or about 60 wt %) of monomer, about 1 wt % to about 5 wt % (e.g., about 1 wt %, about 2 wt %, about 3 wt %, about 4 wt %, or about 5 wt %) of photopolymerization initiator, about 0.1 wt % to about 1.0 wt % (e.g., 0.1 wt %, 0.2 wt %, 0.3 wt %, 0.4 wt %, 0.5 wt %, 0.6 wt %, 0.7 wt %, 0.8 wt %, 0.9 wt %, or 1.0 wt %) of wetting additive, and about 10 wt % to about 30 wt % (e.g., about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, or about 30 wt %) of solvent. The urethane acrylate oligomer may be provided by mixing a two-function urethane acrylate oligomer and a six-function urethane acrylate oligomer.

The urethane acrylate oligomer used in an exemplary embodiment of the present invention is a urethane acrylate oligomer that has a solid content of about 70 wt % to 80 wt % (e.g., about 70 wt %, about 71 wt %, about 72 wt %, about 73 wt %, about 74 wt %, about 75 wt %, about 76 wt %, about 77 wt %, about 78 wt %, about 79 wt %, or about 80 wt %) and has two or six polymeric functional groups. The urethane acrylate oligomer possesses excellent chemical resistance, heat resistance, and excellent physical properties even in used in thin films.

The polymeric functional groups are not especially limited in an exemplary embodiment of the present invention, and they may be an unsaturated group.

In various exemplary embodiments, the content of the urethane acrylate oligomer is limited to be about 20 wt % to about 30 wt % (e.g., about 20 wt %, about 21 wt %, about 22 wt %, about 23 wt %, about 24 wt %, about 25 wt %, about 26 wt %, about 27 wt %, about 28 wt %, about 29 wt %, or about 30 wt %). The reason is because heat resistance deteriorates when the content of the urethane acrylate oligomer is less than 20 wt %. Furthermore, when the content of the urethane acrylate oligomer exceeds 30 wt %, it is difficult to work with and the quality of exterior appearance decreases due to an increase in viscosity. As such, the content or amount of urethane acrylate oligomer is limited to the above range.

In various exemplary embodiments, the urethane acrylate oligomer may be produced by mixing a two-function urethane acrylate oligomer and a six-function urethane acrylate oligomer.

In certain cases, the two-function urethane acrylate oligomer having two polymeric functional groups may improve the adhesiveness to a front resin layer made of a resin material such as plastic, and improve distinctness. In various exemplary embodiments, the urethane acrylate oligomer contains about 7.5 wt % to about 12.5 wt % (e.g., about 7.5 wt %, about 8.0 wt %, about 8.5 wt %, about 9.0 wt %, about 9.5 wt %, about 10.0 wt %, about 10.5 wt %, about 11.0 wt %, about 11.5 wt %, about 12.0 wt %, or about 12.5 wt %,) of the two-function urethane acrylate oligomer. The six-function urethane acrylate oligomer having six polymeric functional groups is added to secure heat resistance and durability. In various exemplary embodiments, the urethane acrylate oligomer contains about 12.5 wt % to about 17.5 wt % (e.g., about 12.5 wt %, about 13.0 wt %, about 13.5 wt %, about 14.0 wt %, about 14.5 wt %, about 15.0 wt %, about 15.5 wt %, about 16.0 wt %, about 16.5 wt %, about 17.0 wt %, or about 17.5 wt %,) of the six-function urethane acrylate oligomer.

In various exemplary embodiments, the two-function urethane acrylate oligomer and the six-function urethane acrylate oligomer are mixed together at a content ratio of 1:1 to 2.5.

If the content ratio is out of the above range, the hardness, durability, heat resistance, and distinctness of the generated film may be unsatisfactory and the manufactured radio-wave transmission cover may be of a poor and undesirable quality. Therefore, it is limited to the above range.

In various exemplary embodiments, the urethane acrylate oligomer does not include a four-function urethane acrylate oligomer. The reason is because, when the six-function urethane acrylate oligomer mixes with the four-function urethane acrylate oligomer, the two-function urethane acrylate oligomer has a relatively low viscosity whereas the four- and six-function urethane acrylate oligomers have a very high viscosity which results in decreased smoothness during working. In addition, even if the four-function urethane acrylate oligomer is added by 15 wt % or more of the total weight of the ultraviolet curable primer, the primer has a distinctness of 60 or less which is unsatisfactory and undesirable.

In various exemplary embodiments, the monomer is an acrylate monomer having two to four polymerizable reactive end groups. The monomer may contribute to the flexibility of the film of paint, the adhesion with the front resin layer, and other physical properties during curing.

In an exemplary embodiment of the present invention, the monomer may be made by mixing about 10 wt % to about 20 wt % (e.g., about 10 wt %, about 11 wt %, about 12 wt %, about 13 wt %, about 14 wt %, about 15 wt %, about 16 wt %, about 17 wt %, about 18 wt %, about 19 wt %, or about 20 wt %) of pentaerythritol tetraacrylate (PETA), about 20 wt % to about 30 wt % (e.g., about 20 wt %, about 21 wt %, about 22 wt %, about 23 wt %, about 24 wt %, about 25 wt %, about 26 wt %, about 27 wt %, about 28 wt %, about 29 wt %, or about 30 wt %) of trimethyol propane triacrylate (TMPTA), and about 5 wt % to about 10 wt % (e.g., about 5 wt %, about 6 wt %, about 7 wt %, about 8 wt %, about 9 wt %, or about 10 wt %) of hexandiol diacrylate (HDDA).

Pentaerythritol tetraacrylate (PETA) is an acrylate monomer that has a solid content of 99 wt % or more, a mean molecular weight of 289.29, and four polymeric functional groups on average. PETA can increase the hardness of the film of paint and enables a fast curing rate during reaction.

If pentaerythritol tetraacrylate (PETA) is added by less than 10 wt %, the film of paint may not be smoothly formed due to a slow reaction rate, and if it is added at more than 20 wt %, defects such as cracks may occur in the film of paint due to a rapid reaction rate. Therefore, the amount of PETA in the monomer is limited to the above range.

Trimethyol propane triacrylate (TMPTA) is an acrylate monomer that has a solid content of 99 wt % or more, a mean molecular weight of 269.329, and three polymeric functional groups on average. TMPTA may affect adhesion with the front resin layer made of a typical polycarbonate (PC) material. If trimethyol propane triacrylate (TMPTA) is added at less than 20 wt %, the adhesion may be decreased, and if it is added at more than 30 wt %, the painting properties may deteriorate and cause white turbidity. Therefore, the amount of TMPTA in the monomer is limited to the above range.

Hexandiol diacrylate (HDDA) is an acrylate monomer that has a solid content of 99 wt % or more, a mean molecular weight of 226, and two polymeric functional groups on average. HDDA may improve the painting properties of the monomer such as spray through viscosity.

If hexandiol diacrylate (HDDA) is added at less than 5 wt %, the painting properties may be worse due to a slight reduction of viscosity, and if it is added at more than 10 wt %, the erosion of the front resin layer may occur, and thus result in a poor exterior appearance. Therefore, the amount of HDDA in the monomer is limited to the above range.

The photopolymerization initiator forms radicals and is added to induce the polymerization of the urethane acrylate oligomer and the monomer. The photopolymerization initiator is preferably added at an amount ranging from about 1 wt % to about 5 wt % (e.g., about 1 wt %, about 2 wt %, about 3 wt %, about 4 wt %, or about 5 wt %).

If the photopolymerization initiator is added at less than 1 wt %, the polymerization rarely occurs, and if it is added at more than 5 wt %, defects such as cracks may occur in the generated film of paint due to rapid polymerization. Therefore, the amount of the photopolymerization initiator used is limited to the above range.

Although BASF is used as the photopolymerization initiator in the exemplary embodiment of the present invention, the present invention is not limited thereto. For example, various photopolymerization initiators may be used as long as the polymerization of the urethane acrylate oligomer and the monomer may be induced.

A wetting additive may be used to prevent defects such as wrinkles from occurring in the exterior appearance by securing wettability and forming the smooth flow of paint during painting, and to improve the leveling of the film of paint.

Although a polyether siloxane additive is used as the wetting additive in the exemplary embodiment of the present invention, the present invention is not limited thereto. For example, various wetting additives may be used as long as the leveling and painting of the film of paint may be improved.

In various exemplary embodiments, the wetting additive is added at an amount ranging from about 0.1 wt % to about 1.0 wt %. The reason is because, if the wetting additive is added at less than 0.1 wt %, it is difficult to obtain the necessary wettability and if it is added by more than 1.0 wt %, defects such as white turbidity may occur due to a reduction of leveling.

An alcoholic solvent may be used as the solvent according to the exemplary embodiment of the present invention so as not to cause the erosion of the front resin layer made of a polycarbonate material. The solvent may be added at an amount ranging from about 10 wt % to about 30 wt % based on 100 wt % of the ultraviolet curable primer for a radio-wave transmission cover of a vehicle.

Hereinafter, the present invention will be described in more detail with reference to an example and comparative examples.

FIG. 1 is a table measuring and indicating physical properties for comparative examples and an example having various compositions.

In the table, the haze indicative of transparency is measured using a hazemeter of the Murakami company. When the haze is 3% or more, it is determined that a haze defect occurs. The exterior appearance is measured using a wave scan-DOI of the BYK Gardner company, and the CF value which is a general grade of orange peel of gloss and distinctness is measured.

The heat resistance is classified according to whether or not a crack occurs upon applying a primer and then performing heat treatment at a temperature of 230° C. for 10 minutes. The water resistance is tested through adhesiveness by disposing a sample within a chamber, which is filled with water and has a temperature of 40° C., for 240 hours and then checking an exterior appearance change such as discoloration, cracks, or swelling. The weather resistance is tested by illuminating a sample with ultraviolet light of 2,500 kJ/m$^2$ according to SAE J1960 and then checking an exterior appearance change.

As illustrated in FIG. 1, a urethane acrylate oligomer is used in comparative examples 1 to 3. In this case, it can be seen that, as the polymeric functional group is small, the exterior appearance is good, but the curing density is low and the heat resistance is difficult to satisfy a reference value. In addition, it can be seen that, when there are six polymeric functional groups, the heat resistance and the durability satisfy a reference value, but the exterior appearance does not satisfy a reference value since it has a distinctness of 55.

In comparative examples 4 and 5, a polyester acrylate oligomer, which has a molecular weight of 1,000 to 1,500 and has two or six polymeric functional groups, is used, instead of the urethane acrylate oligomer, to form a film of paint.

As seen in the comparative examples 4 and 5, it can be seen that, when the polyester acrylate oligomer is used, the distinctness is excellent, but haze defects can appear in the film of paint and particularly, the heat resistance does not satisfy the reference value of the present invention.

In particular, in the comparative example 4, it can be seen that haze defects such as the blurring of the curing film of paint occur since the reaction rate is slow due to a small functional group.

Accordingly, it can be seen that the urethane acrylate oligomer is preferably used to secure all of the exterior appearance, the heat resistance, and the durability.

In comparative example 6, it can be seen that a quality of exterior appearance is deteriorated due to defects such as cracks occurring in the process of curing a film of paint due to a fast reaction rate during ultraviolet curing according to excessive addition of a six-function urethane acrylate oligomer.

Meanwhile, in comparative examples 7 and 8, a two-function urethane acrylate oligomer and a six-function urethane acrylate oligomer are mixed and used to simultaneously secure heat resistance, water resistance, and weather resistance while securing the excellent exterior appearance of a radio-wave transmission cover of a vehicle. However, it can be seen that, since they exceed the reference range of the present invention, the distinctness and the heat resistance do not satisfy the reference range of the present invention.

On the other hand, in example 1, it can be seen that when satisfying the reference range of the present invention, the distinctness is 70 which is more than a distinctness reference value of 65 or more required for the radio-wave transmission cover of the vehicle, and all of heat resistance, water resistance, and weather resistance satisfy the reference value.

It will be apparent to those skilled in the art that various modifications and variations can be made in an exemplary embodiment of the present invention without departing from the spirit or scope of the inventions. Thus, it is intended that the present invention covers the modifications and variations of this invention provided they come within the scope of the appended claims and their equivalents.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An ultraviolet curable primer for a radio-wave transmission cover of a vehicle comprising:
   about 20 wt % to about 30 wt % of urethane acrylate oligomer, about 35 wt % to about 60 wt % of monomer, about 1 wt % to about 5 wt % of photopolymerization initiator, about 0.1 wt % to about 1.0 wt % of wetting additive, and about 10 wt % to about 30 wt % of solvent,
   wherein the urethane acrylate oligomer comprises about 7.5 wt % to about 12.5 wt % of two-function urethane acrylate oligomer based on the total weight of the ultraviolet curable primer, and about 12.5 wt % to about 17.5 wt % of six-function urethane acrylate oligomer based on the total weight of the ultraviolet curable primer, and wherein the ultraviolet curable primer is applied to a radio-wave transmission cover comprising a multilayered oxide optical film.

2. The ultraviolet curable primer according to claim 1, wherein the monomer comprises about 10 wt % to about 20 wt % of pentaerythritol tetraacrylate (PETA), 20 to 30 wt % of trimethyol propane triacrylate (TMPTA), and about 5 wt % to about 10 wt % of hexandiol diacrylate (HDDA) based on the total weight of the ultraviolet curable primer.

3. The ultraviolet curable primer according to claim 1, wherein the urethane acrylate oligomer is provided by mixing the two-function urethane acrylate oligomer and the six-function urethane acrylate oligomer at a weight ratio of 1:1 to 2.5.

4. The ultraviolet curable primer according to claim 1, wherein the urethane acrylate oligomer does not comprise a four-function urethane acrylate oligomer.

5. The ultraviolet curable primer according to claim 1, wherein the urethane acrylate oligomer has a solid content of about 70 wt % to about 80 wt %.

6. The ultraviolet curable primer according to claim 1, wherein a crack does not occur in the ultraviolet curable primer after elapse of about 10 minutes to about 20 minutes at a temperature of about 220° C. to about 240° C. after the ultraviolet curable primer is dried.

7. The ultraviolet curable primer according to claim 1, wherein the ultraviolet curable primer has a distinctness of 65 or more after it is dried, and a haze defect does not occur in a film of paint.

8. The ultraviolet curable primer according to claim 2, wherein the urethane acrylate oligomer is provided by mixing the two-function urethane acrylate oligomer and the six-function urethane acrylate oligomer at a weight ratio of 1:1 to 2.5.

9. The ultraviolet curable primer according to claim 2, wherein the urethane acrylate oligomer does not comprise a four-function urethane acrylate oligomer.

10. The ultraviolet curable primer according to claim 2, wherein the urethane acrylate oligomer has a solid content of about 70 wt % to about 80 wt %.

11. The ultraviolet curable primer according to claim 2, wherein a crack does not occur in the ultraviolet curable primer after elapse of about 10 minutes to about 20 minutes at a temperature of about 220° C. to about 240° C. after the ultraviolet curable primer is dried.

12. The ultraviolet curable primer according to claim 2, wherein the ultraviolet curable primer has a distinctness of 65 or more after it is dried, and a haze defect does not occur in a film of paint.

* * * * *